(12) United States Patent
Godshaw et al.

(10) Patent No.: US 7,521,638 B1
(45) Date of Patent: Apr. 21, 2009

(54) PORTABLE SCALE

(75) Inventors: Donald E. Godshaw, Wilmette, IL (US);
Brad L. Schantz, Evanston, IL (US);
Zoran Gracer, Deerfield, IL (US)

(73) Assignee: Travel Caddy, Inc., Elk Grove Village, IL (US)

( * ) Notice: Subject to any disclaimer, the term of this patent is extended or adjusted under 35 U.S.C. 154(b) by 0 days.

(21) Appl. No.: 12/036,832

(22) Filed: Feb. 25, 2008

(51) Int. Cl.
*G01G 21/28* (2006.01)

(52) U.S. Cl. .......................... 177/126; 177/238; D10/92

(58) Field of Classification Search ................. 177/126, 177/127, 238, 244; D10/91, 92
See application file for complete search history.

(56) References Cited

U.S. PATENT DOCUMENTS

| | | | | |
|---|---|---|---|---|
| D274,991 S | * | 8/1984 | Wirtz ........................... D10/92 |
| 4,582,151 A | * | 4/1986 | Mairot et al. ................ 177/144 |
| 4,711,313 A | * | 12/1987 | Iida et al. ...................... 177/127 |
| D304,308 S | * | 10/1989 | Morooka ...................... D10/92 |
| 5,414,225 A | * | 5/1995 | Garfinkle .................... 177/199 |
| 5,637,838 A | * | 6/1997 | Arey et al. .................. 177/148 |
| 5,994,649 A | * | 11/1999 | Garfinkle et al. .......... 177/25.11 |
| 6,765,154 B2 | * | 7/2004 | Sternberg .................... 177/126 |
| 7,022,920 B2 | * | 4/2006 | Hulburt et al. .............. 177/126 |
| D521,887 S | * | 5/2006 | Huang ......................... D10/91 |
| 7,060,914 B2 | * | 6/2006 | Suzuki ........................ 177/238 |
| D579,363 S | * | 10/2008 | Kobayakawa et al. ........ D10/92 |
| 7,435,917 B2 | * | 10/2008 | Hulburt et al. .............. 177/126 |
| 2006/0118342 A1 | * | 6/2006 | Hulbert et al. .............. 177/126 |

* cited by examiner

*Primary Examiner*—Randy W Gibson
(74) *Attorney, Agent, or Firm*—Banner & Witcoff, Ltd.

(57) ABSTRACT

A travel scale includes side housings which telescopically connect to a center bridging section that receives signals from load cells located on the bottom side of the side housings. The signals are transmitted to a readout in the bridging section. Upon closing of the housings, the bridging section is protectively covered by the top side of the housings.

8 Claims, 8 Drawing Sheets

PORTABLE SCALE

BACKGROUND OF THE INVENTION

In a principal aspect the present invention relates to a portable scale and, more particularly, to a portable, lightweight scale that may be carried by a traveler and used by the traveler to measure the weight of an individual as well as the weight of luggage and other items.

It is often desirable when traveling to obtain information regarding the weight of an individual. This is especially desired when one is traveling on a lengthy journey. Additionally, it is often desirable to determine the weight of the luggage which one is packing for travel inasmuch as many carriers, particularly airlines, have weight limitations for luggage. Thus, access to a device for determining the weight of luggage or a person is a desirable objective for a traveler.

Heretofore, it has been suggested that a weight measurement device may include a spring loaded scale. While such a device may be useful, it is not useful for the accurate measurement of the weight of an individual and may not have the dual capability for weighing an individual as well as luggage which an individual may be transporting.

Further, even if one is not traveling, the availability of a lightweight, portable, reduced size scale is desirable. Such a device should be capable of being easily stored when not in use, compact and rugged.

Thus, there has developed a need for a small and highly accurate scale which can be used by a traveler as well as in the home.

SUMMARY OF THE INVENTION

Briefly, the present invention comprises a portable scale which includes a pair of generally rectangular shaped side housings that are telescopically connected to a center or bridging section covered or enclosed by or within the side housings when the scale is not in use. The side housings may thus be telescopically separated from the center bridging section to reveal the bridging section and a weight or scale readout window maintained in the bridging section. Each of the separate side housings includes one or more load cells on the bottom side thereof which provide signals through leads to a processor in the bridging section where they are processed to indicate the weight supported or placed on the scale. Typically, the signals are routed from the load cells by wire leads into the bridging section where they are processed or summed to indicate the weight upon the scale. The load cells are positioned in legs extending from the bottom side of the scale and, more particularly, from the bottom side of the respective side housings of the scale.

The top side of each of the side housings defines a generally flat planar surface upon which an individual may stand when the side housings are telescopically separated or upon which luggage may be placed when the side housings are so separated. To prevent slippage or undesired movement when standing on the scale, the top panels or surfaces of the side housings may include a non-slip surface or protrusions which facilitate non-slippage. The scale is lightweight and highly compact having dimensions in the range of less than one foot wide by one half foot from the front to back when in the operative or open weight measurement position and foldable into a compact 6 by 8 inch size when the center section is covered by the side housings.

Thus, it is an object of the invention to provide a small, yet highly accurate scale which may be used to weigh an individual as well as items such as luggage.

Another object of the invention is to provide a lightweight, highly accurate, inexpensive scale which can be easily carried or moved.

Yet another object of the invention is to provide a scale which is comprised of a pair of generally rectangular side housings connected together by a bridging section that is revealed upon separation of the side housings. Such separation also activates the scale and provides a readout to indicate weight placed upon the scale.

These and other objects, advantages and features of the invention will be set forth in the detailed description which follows.

BRIEF DESCRIPTION OF THE DRAWING

In the detailed description which follows, reference will be made to the drawing comprised of the following figures.

DESCRIPTION OF AN EMBODIMENT OF THE INVENTION

Referring to the figures, the scale as depicted generally has the form of a rectangular parallelepiped. The scale is comprised of a first side housing 20 and a second side housing 22 which is generally identical to the first housing 20. The first side housing 20 includes a top side panel 24 with an array of smooth or slightly abrasive surfaced ribs, projections or protrusions, such as protrusions 26, which are attached, inserted or formed in the planar top panel 24 and function to prevent slipping by an individual when standing on the housings 20, 22 during a weighing operation. For example, rubberized beads 26 are adhered to the flat planar top panel 24.

The top side panel 24 is generally rectangular and is spaced from a removable second or bottom side panel 28 by a circumferential, depending lateral wall or side 36. The side housings 20, 22 thus include or define an interior space or section or chamber 30. The lateral side 36 of the housing 20 separates bottom side 28 from top side 24 and generally encloses the chamber 30.

A first load cell 32 is located adjacent an outside corner of the housing 20 and a second load cell 34 is located adjacent an opposite outside corner. The load cells 32 and 34 are located respectively in posts 33, 35 projecting below bottom panel 28 and include leads 37, 39 that provide for a signal output to a processor upon the placement of weight upon the top panel 24.

Figure 3:
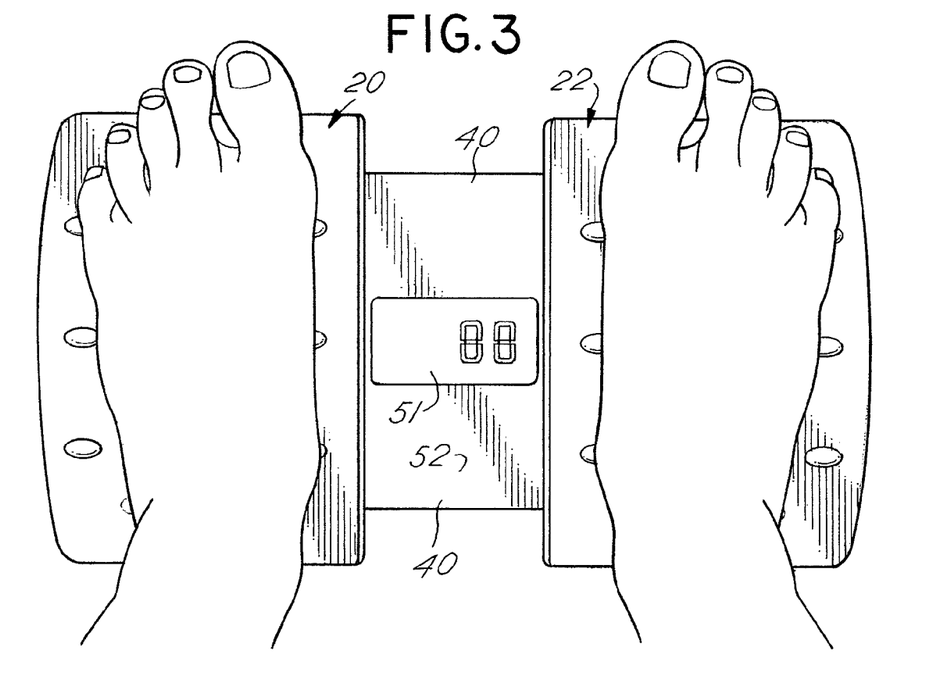
FIG. 3 is a top plan view of the scale of FIG. 2 indicating the manner of use of the scale by an individual to determine the weight of that individual.
Figure 4:
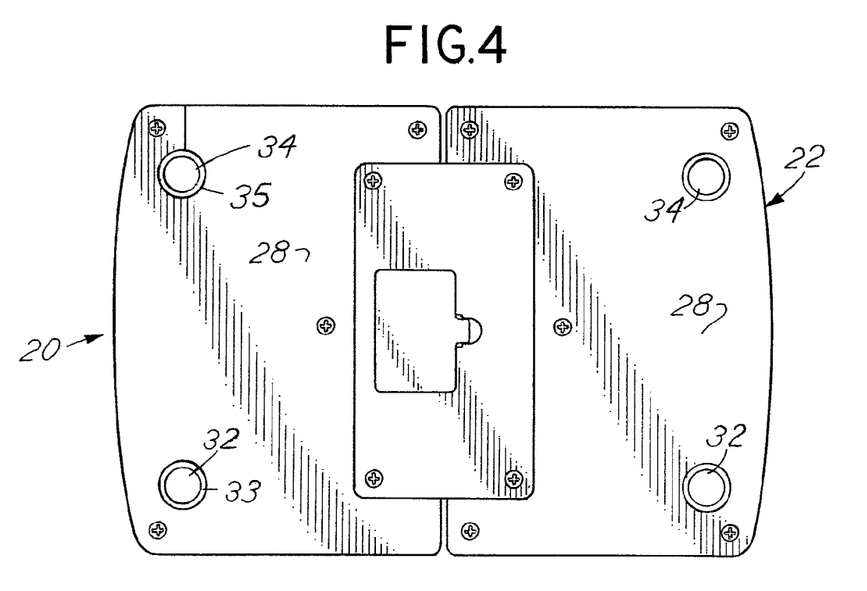
FIG. 4 is a bottom plan view of the scale of FIG. 1.
Figure 5:
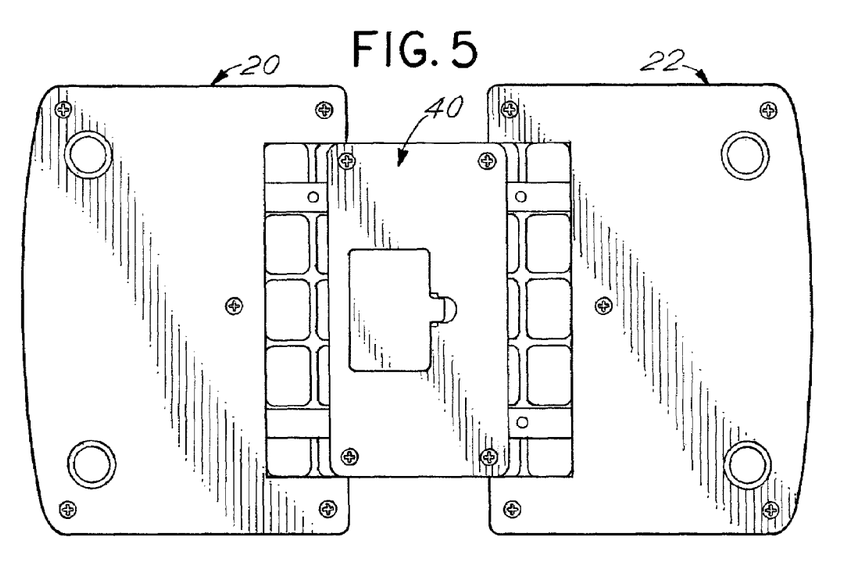
FIG. 5 is a bottom plan view of the scale as depicted in FIG. 2.
Figure 6:
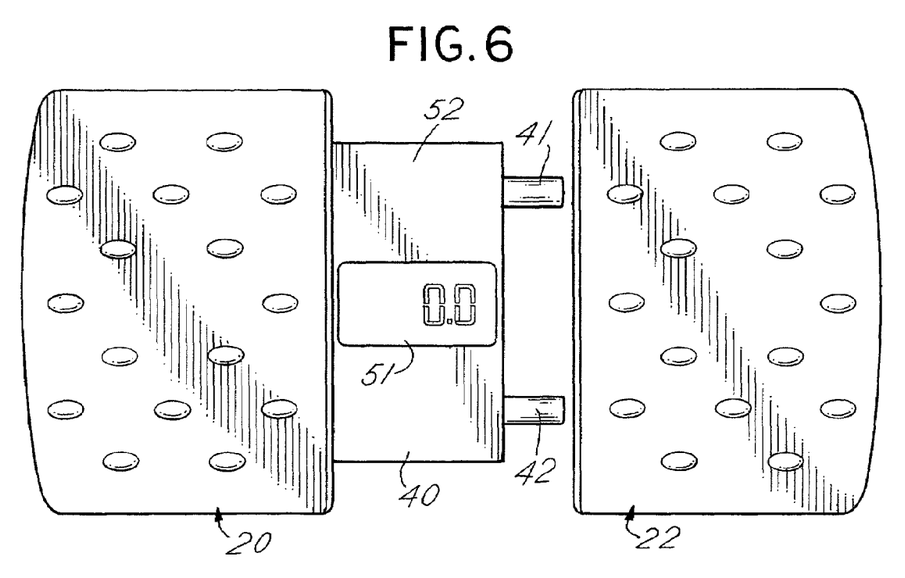
FIG. 6 is a top plan view depicting the scale of FIG. 1 and further illustrating the relationship of one of the side housings associated with the scale to the center bridging section.
Figure 7:
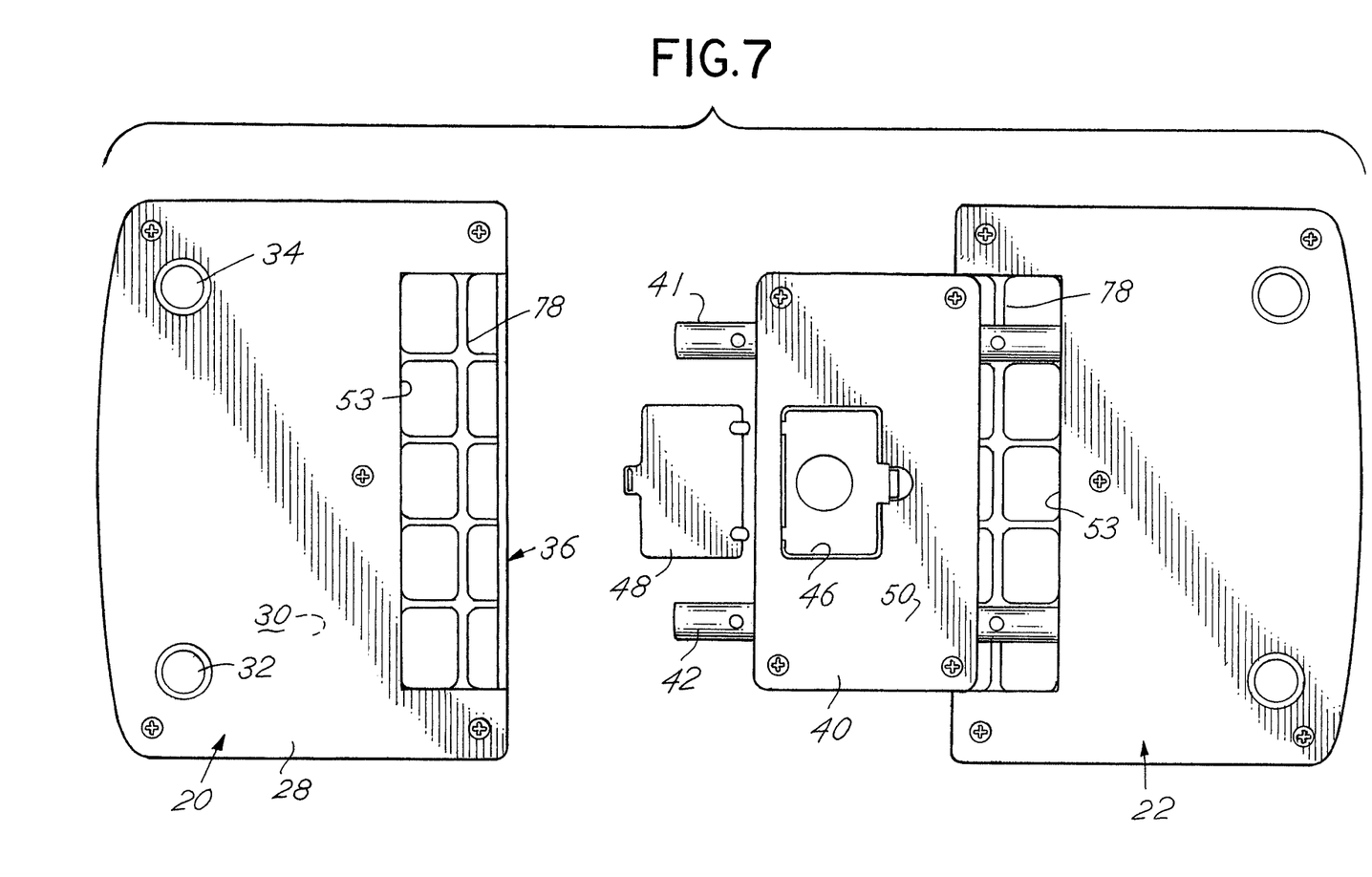
FIG. 7 is an exploded bottom plan view of the scale depicted in FIG. 6.

The second housing 22 is substantially identical to first housing 20 and is thus a mirror image of the first housing 20 when assembled in the embodiment depicted. The first housing 20 and the second housing 22 are joined together by slide rods 41 and 42 that extend through the bridging section 40 and guide the bridging section 40 between a covered position and an uncovered position by top panel 24 of side housings 20, 22. A battery chamber 46 is provided in the bridging section 40 and has a battery chamber cover 48 located in the bottom side 50 of the bridging section 40. Within the bridging section 40 is the appropriate circuitry that connects with leads 37, 39 from the load cells 32 and 34 of the housings 20 and 22 and provides a readout of the weight on the scale, for example, of a person standing thereon as depicted in FIG. 3. A numeric readout is thus provided through the window 51 in the top side 52 of the bridging section 40. The bridging section 40 is designed to fit under the top side 24 nested within a slot 53 in each of the housings 20 and 22 by telescopically sliding into those housings 20, 22.

Figure 1:
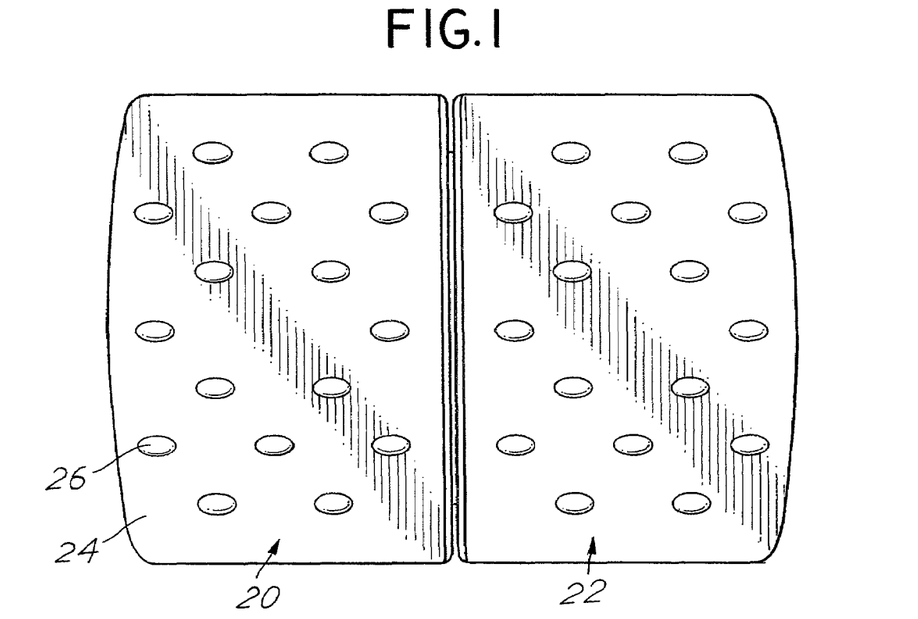
FIG. 1 is a top plan view of an embodiment of the scale of the invention.
Figure 2:
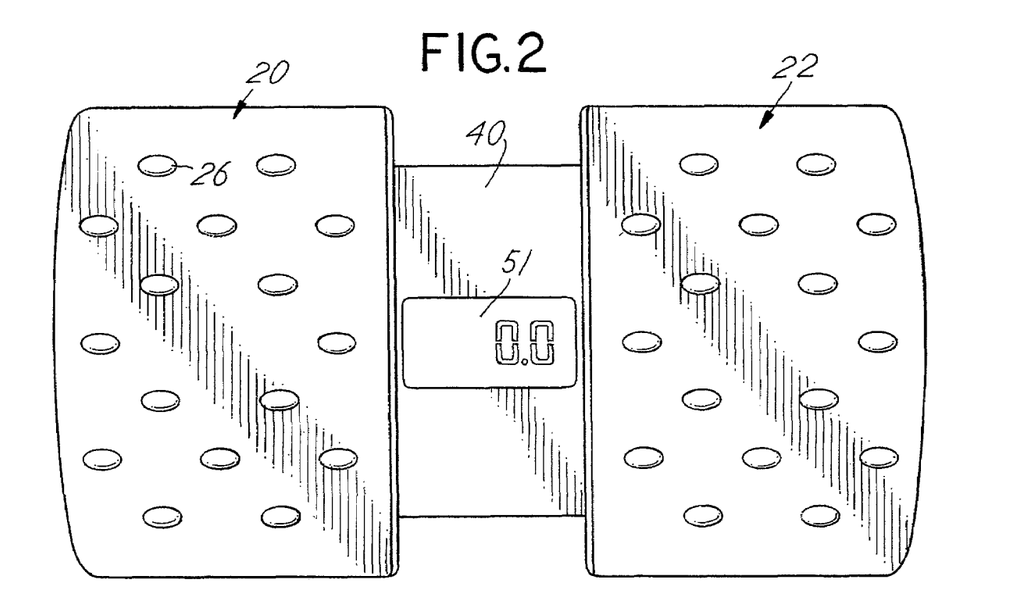
FIG. 2 is a top plan view of the scale of FIG. 1 wherein the scale has been manipulated or opened to activate the readout mechanism and the weight sensing mechanism associated with the scale.

When the scale is in the closed or retracted position as shown in FIG. 1, a typical dimensional size thereof is six inches by eight or ten inches. Upon opening of the scale as depicted in FIG. 2, the arrangement is expanded to a dimension of six inches by twelve inches. The dimensions are not limiting but are provided as typical.

The scale is maintained in the closed or retracted position as well as in the open or expanded or uncovered position by coaction of spring biased ball bearings which fit into detents provided in the rods 41 and 42. By way of example, a spring 61 impinges against a bearing 63 and is designed to fit into a detent opening 65 in a rod 41. The spring 61 and bearing 63 are located in a rib 67 located on the inside wall or flange of a housing 20. A detent 65 is provided in each rod 41 or 42 for maintaining the scale in both the open as well as the closed position. Further, the rods 41 and 42 are hollow so that the lead wires may pass through the rods 41 and 42 to exit through openings such as openings 69 and 70 within the bridging section 40 where those leads 37, 39 are connected to the processor 71 that sums and processes the signals and provides a readout through the window 51. The ends of the rods 41 and 42 include caps or fittings 72 to guide the lead wires 37, 39 into the hollow rods 41 and 42.

The housings 20 and 22, as well as the bridging section 40, may all be cast from metal such as aluminum or an aluminum titanium alloy or another alloy. The housings 20, 22 and bridging section 40 may include a pattern of reinforcing ribs 78 to maintain their structure of integrity. Preferably, the rods 41 and 42 are cylindrical, however, they have a non-circular cross sectional shape and be keyed to openings 69, 70 into which they slide in the respective housings 20, 22. The rods 41 and 42 extend, in the embodiment depicted, an equal dimensional distance from lateral sides 74 and 76 of the bridging section 40. Thus, it can be seen that the scale is symmetrical and moves in a symmetrical fashion between the covered or closed and uncovered or open position.

The posts 33, 35 which support and house the load cells 32, 34 are located at the corners of the scale. It is possible to adjust the position of the load cells 32, 34 relative to the geometry of the configuration of the scale and the housings 20, 22 comprising the scale. However, by positioning the load cells 32, 34 an equal distance from the center line of the scale and at the corners of the scale facilitates a more efficient manner in which to electronically manipulate the readings and provide an accurate scale reading.

Figures 8, 8A:
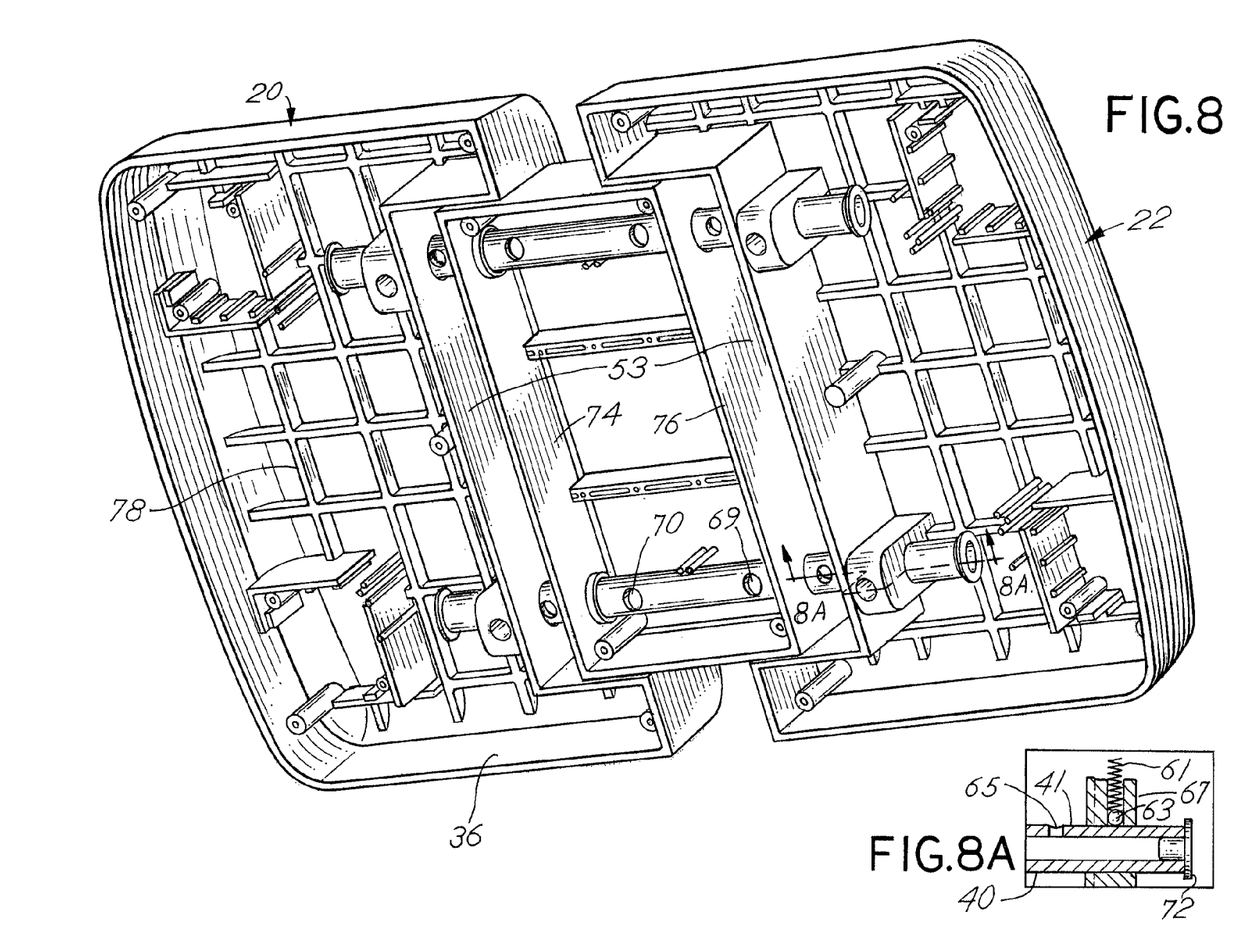
FIG. 8 is a bottom isometric view of the side housings and center bridging section.
Figure 9:
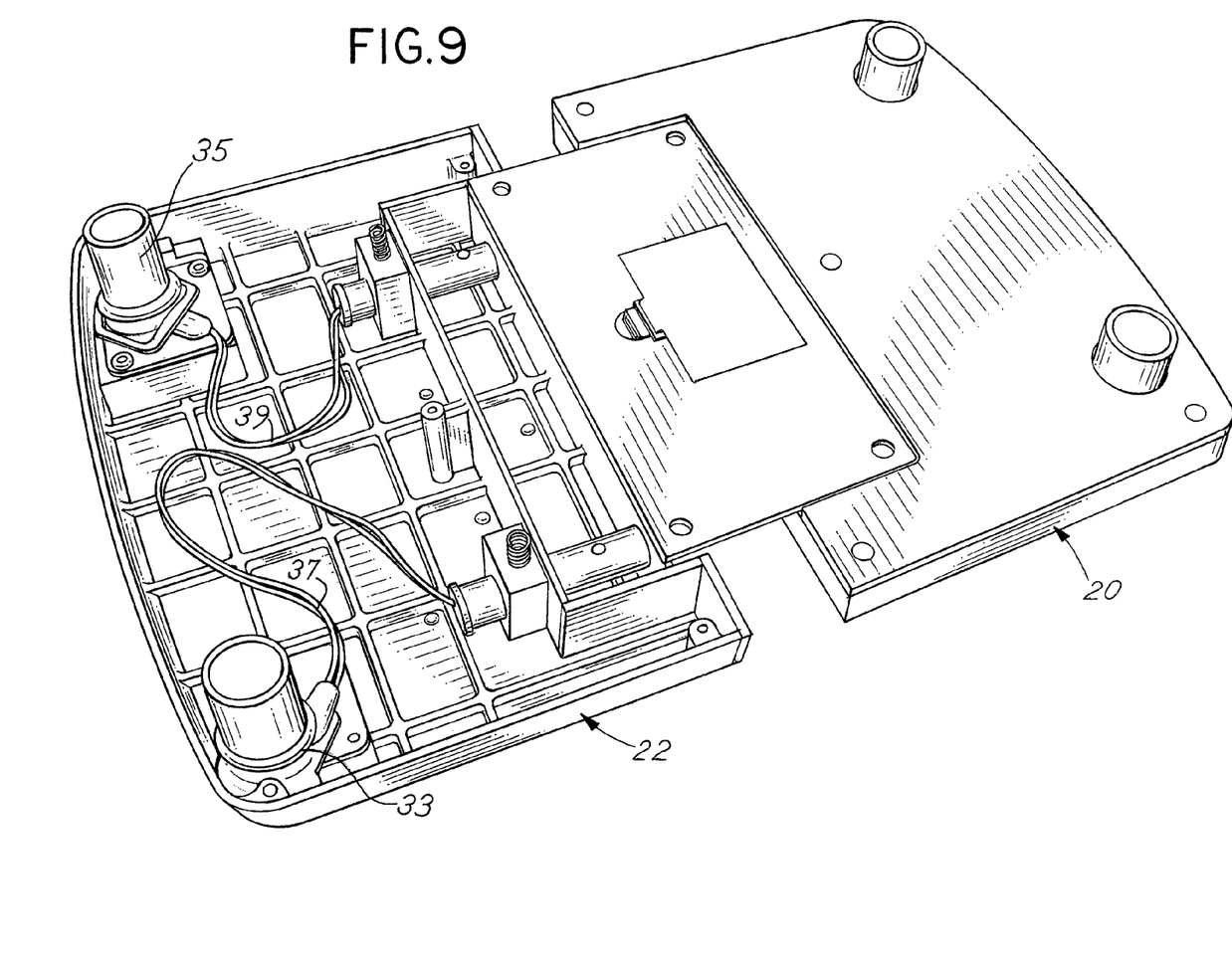
FIG. 9 is a bottom isometric view similar to FIG. 8 depicting the circuit lead wires from the sensors or load cells.
Figure 10:
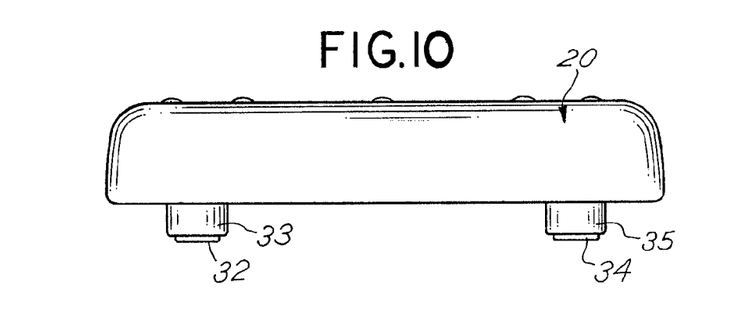
FIG. 10 is a side elevation of the scale of FIG. 1.
Figure 11:
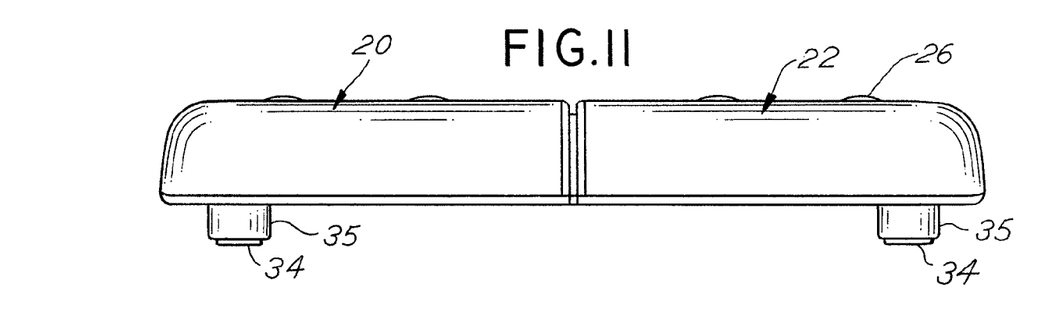
FIG. 11 is a front side elevation of the scale of FIG. 1.
Figure 12:
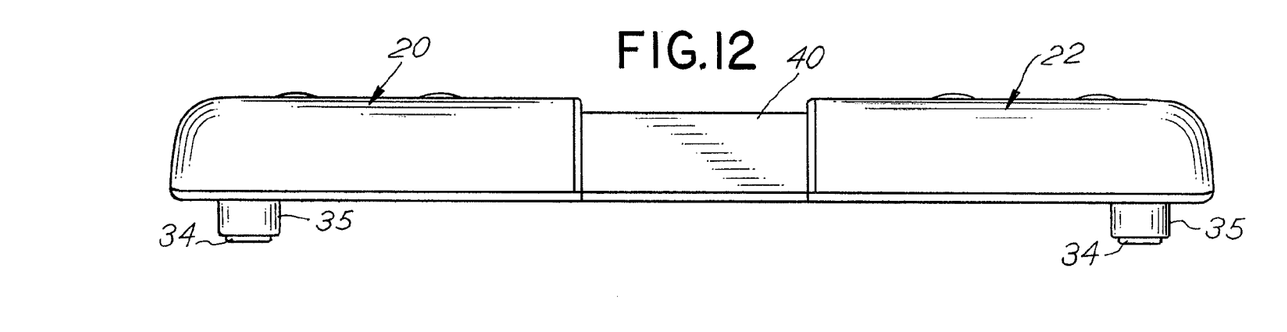
FIG. 12 is a front side elevation of the scale configuration of FIG. 2.

As depicted in FIG. 8 the load cells 32, 34 project downwardly from the bottom side panel 28. Thus, there is a clearance between the load cells 32, 34 and the housings as well as the bridging section 40 in the disclosed embodiment.

Figure 13:
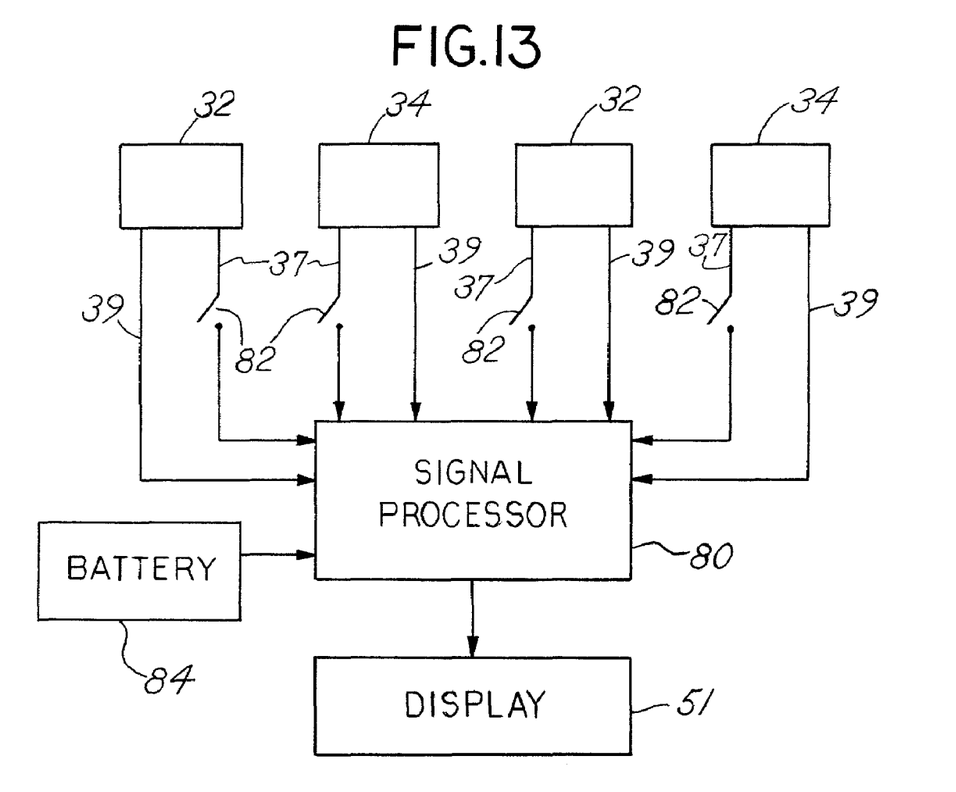
FIG. 13 is a block circuit diagram illustrating the manner of processing signals associated with the measurement of weight as a result of the load on the load cells associated with the scale of the embodiment depicted.

FIG. 13 is a block diagram of the circuitry associated with the load cells 32, 34 and which provides the relevant readout of weight. The load cells 32, 34 are connected by leads to a processor 71. Leads 37 connect through a switch 82 which is in the "off" condition until the housings 20, 22 are telescopically opened. Upon opening of housings 20, 22 to expose display 51, the signals from the load cells may be processed to provide a weight indication. Battery 84 in chamber 46 provides power to the processor 80. The scale is especially useful for the weight measurement of an individual inasmuch as an individual can observe the weight by viewing the numeric readout between their feet as shown in FIG. 3. The scale, however, may be utilized for other purposes such as weighing luggage. However, viewing of the weight measurement may be more difficult because the luggage may span the housings 20, 22 and cover the bridging section 40. The readout window 51 may be exposed by appropriately positioning an item on the scale.

While there has been set forth a preferred embodiment of the invention, it is to be understood that the invention is limited only by the following claims and equivalents thereof.

What is claimed is:

1. A portable scale comprising in combination:
   a first side housing including a top panel to provide a foot support surface with a circumferential edge, and a lateral side extending at least partially around the edge to form a chamber under the top panel;
   a second side housing comprising a substantially mirror image of the first housing section; and
   a bridging section with a top side panel, said bridging section telescopically joined to at least one of the first and second side housings and slidable in a solely linear direction toward and away from the lateral side of at least said one side housing between a retracted position covering the entirety of the bridging section and an extended position exposing the top side panel of the bridging section with the first and second housings separated;
   said first housing and said second housing each including at least one supporting load cell projecting from the bottom panel;
   a load cell readout mechanism and processor housed in the bridging section readable from the top side panel of the bridging section when said first and second housings are in the extended position;
   at least one switch for enabling the readout mechanism upon telescopically extending at least said one side housing to the extended position to thereby expose the bridging section top side panel, said top panel of said one housing covering said top side panel of said bridging section at least in part when said bridging section is in the retracted position.

2. The scale of claim 1 wherein each side housing includes first and second load cells, said first and second load cells arrayed at spaced locations to provide a weight signal responsive to a weight located upon the top panel of each of said side housings.

3. The scale of claim 1 wherein said top panel surface of each side housing is generally a flat planar surface and includes surface projections.

4. The scale of claim 1 wherein said side housings form a generally rectangular surface.

5. The scale of claim 1 wherein the side housings are slidably mounted on at least two spaced hollow rods attached to the bridging section and wherein the load cells include lead wires to the bridging section through the rods.

6. The scale of claim 5 wherein the housings include a detent mechanism for holding the housings at a fixed telescopic position on the rods.

7. The scale of claim 1 wherein each side housing includes a slot in opposed sides of said housings for slidable receipt of the bridging section and coverage thereof by the top panels of said side housings in the retracted position, said side housings each connected to the load cells including leads extending through said hollow rods to the bridging section processors.

8. The scale of claim 7 including a detent mechanism for holding the housings at fixed telescopic position on the rods.

\* \* \* \* \*